264-568 SR

OR T 873,007

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 14, 1970

873 O.G. 339

T873,007

METHOD AND APPARATUS FOR THE PRODUCTION OF EXTRUDED TUBING

Alistair Paul Bennett and John Peter Grove, Welwyn Garden City, England, assignors to Imperial Chemical Industries Limited, London, England, a corporation of Great Britain

Filed June 2, 1969, Ser. No. 829,269

Claims priority, application Great Britain, June 17, 1968, 28,681/68

Int. Cl. B29c *17/07;* B29d *23/04*

U.S. Cl. 264—90

2 Sheets Drawing. 5 Pages Specification

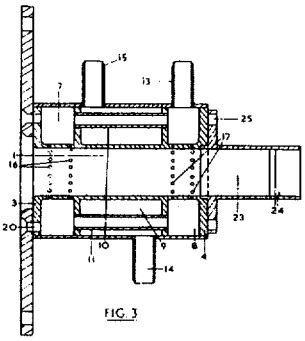

FIG. 3

Figure 1:
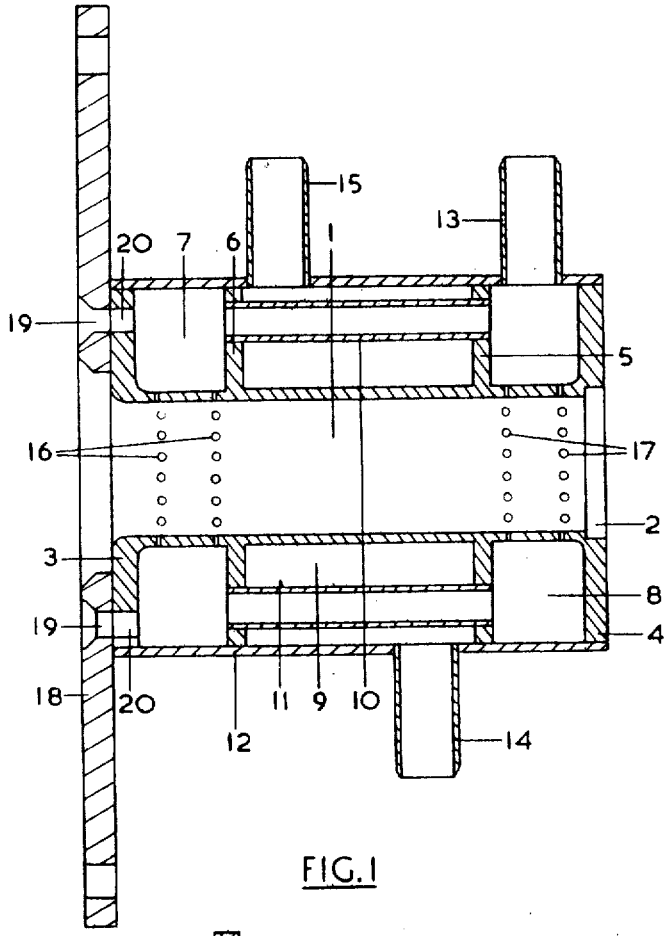
Figure 2:
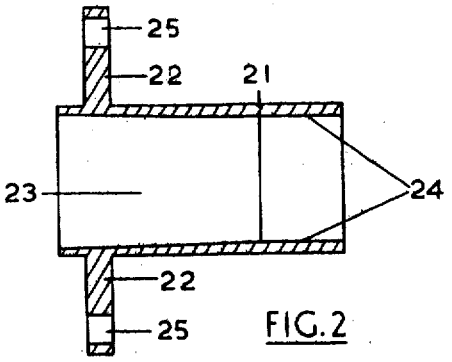
Figure 3:
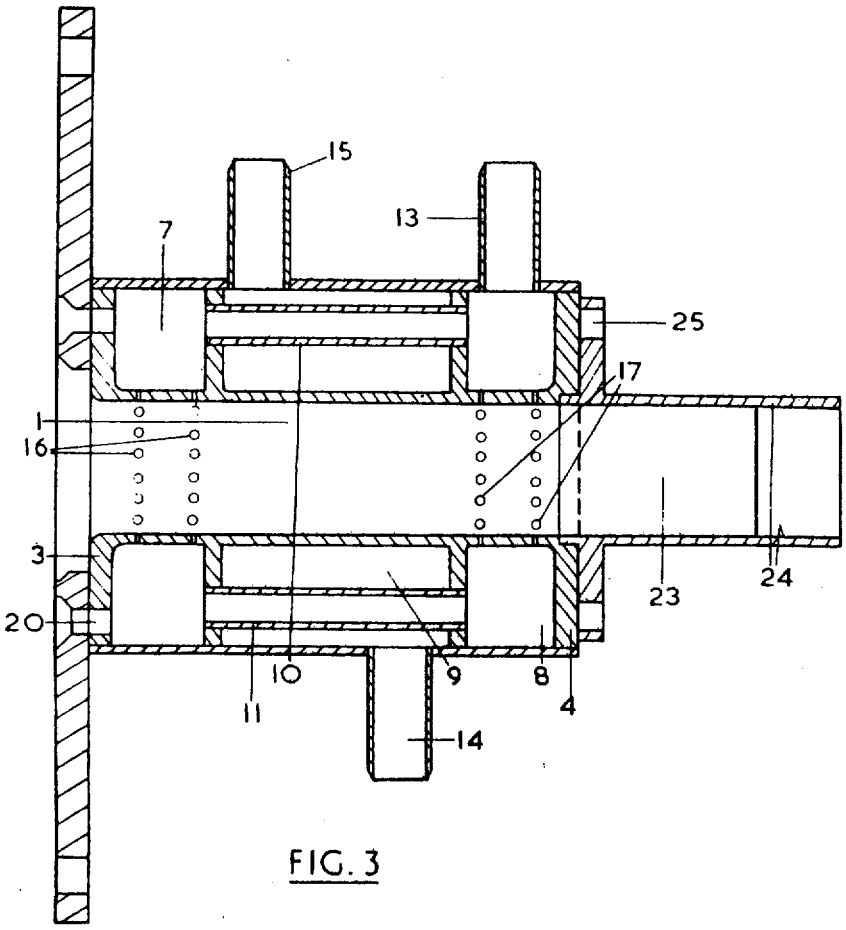

A method and apparatus are disclosed for the production of extruded tubing made of polymeric materials. The process consists of the sequential steps of extruding the polymeric material first through a water-cooled vacuum sizing die having a smooth central bore (1) with a vacuum zone at either end, and then a contraction die having a smooth passageway (23) therethrough a decreasing size from the entry point to the exit point. The contraction die is mounted adjacent to the vacuum die (FIG. 3).

The preferred polymeric material to be used according to the process is 4-methyl pentene-1. Because of the high melting point of 4-methyl pentene-1, tubing thus produced has a smooth surface finish, can be easily sterilized, and is suitable for laboratory, hospital and dairy equipment.

A hot extruded parison at a temperature in excess of the melting point of the polymeric material is passed into the vacuum die, suction is applied through the vacuum zone thereby causing the tubing to conform to the smooth surface of the bore. The heated tubing is then passed into the contraction die where it cools and contracts. Tubing having a smooth surface finish results.

264-568

SR

OR T 873,007

April 14,

T873,007

D TUBING

Filed June 2, 1969

2 Sheets-Sheet 1

INVENTORS
ALISTAIR PAUL BENNETT
JOHN PETER GROVE
BY Cushman, Darby & Cushman
ATTORNEYS 264-568 SR

OR T 873,007

April 14, 1970 A. P. BENNETT ETAL T873,007

METHOD AND APPARATUS FOR THE PRODUCTION OF EXTRUDED TUBING

Filed June 2, 1969 2 Sheets-Sheet 2

INVENTORS
ALISTAIR PAUL BENNETT
BY JOHN PETER GROVE
Cushman, Darby & Cushman
ATTORNEYS